(12) United States Patent
Hall et al.

(10) Patent No.: US 9,973,989 B2
(45) Date of Patent: May 15, 2018

(54) CO-LOCATION OF APPLICATION SERVICE PLATFORM WITH ACCESS NODE AND LOCAL GATEWAY

(71) Applicant: Telefonaktiebolaget L M Ericsson (publ), Stockholm (SE)

(72) Inventors: Göran Hall, Mölndal (SE); Jari Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 457 days.

(21) Appl. No.: 14/406,623

(22) PCT Filed: Oct. 19, 2012

(86) PCT No.: PCT/EP2012/070825
§ 371 (c)(1),
(2) Date: Dec. 9, 2014

(87) PCT Pub. No.: WO2014/008959
PCT Pub. Date: Jan. 16, 2014

(65) Prior Publication Data
US 2015/0180945 A1 Jun. 25, 2015

Related U.S. Application Data

(60) Provisional application No. 61/669,750, filed on Jul. 10, 2012.

(30) Foreign Application Priority Data

Oct. 15, 2012 (WO) .................. PCT/EP2012/070395
Oct. 15, 2012 (WO) .................. PCT/EP2012/070397
Oct. 15, 2012 (WO) .................. PCT/EP2012/070398

(51) Int. Cl.
*H04L 29/08* (2006.01)
*H04L 12/46* (2006.01)
(Continued)

(52) U.S. Cl.
CPC ......... *H04W 36/12* (2013.01); *H04L 12/4633* (2013.01); *H04L 67/10* (2013.01);
(Continued)

(58) Field of Classification Search
CPC ... H04W 4/20; H04W 88/08; H04W 36/0033; H04W 4/003; H04W 88/16; H04W 36/18;
(Continued)

(56) References Cited

U.S. PATENT DOCUMENTS 9,357,384 B2 * 5/2016 Ibrahim ................. G06Q 30/00
9,491,305 B2 * 11/2016 Kallio ............... H04M 3/42153
(Continued)

FOREIGN PATENT DOCUMENTS

EP 1701516 A1 9/2006
EP 1708423 A1 10/2006
(Continued)

OTHER PUBLICATIONS

3rd Generation Partnership Project, "3rd Generation Partnership Project; Technical Specification Group Services and System Aspects; IP Multimedia Subsystem (IMS) Service Continuity; Stage 2 (Release 12)", Technical Specification, 3GPP TS 23.237 V12.0.0, Jun. 1, 2012, pp. 1-165, 3GPP, France.
(Continued)

*Primary Examiner* — Abdullahi E Salad
(74) *Attorney, Agent, or Firm* — Coats & Bennett, PLLC

(57) ABSTRACT

A telecommunications network which is accessible to a user equipment (10) via an access node (110) provided with an application service platform (150). The application service platform (150) may be used for locally supporting one or more application services which are accessible to the user equipment (10) via the access node (110). Further, a local gateway node (120) is co-located with the access node (110). The local gateway node (120) carries user plane data of the
(Continued)

user equipment (10) between the access node (110) and the application service platform (150). Control plane communication between the local gateway node (120) and at least one central node (212, 214, 216, 218) of the telecommunications network is performed via a central gateway node (210) connected between the local gateway node (120) and the central node (212, 214, 216, 218) of the telecommunications network.

19 Claims, 13 Drawing Sheets

(51) Int. Cl.
| | |
|---|---|
| *H04W 4/00* | (2009.01) |
| *H04W 36/12* | (2009.01) |
| *H04W 4/20* | (2018.01) |
| *H04W 88/08* | (2009.01) |
| *H04W 36/00* | (2009.01) |
| *H04M 1/725* | (2006.01) |
| *H04W 36/18* | (2009.01) |
| *H04W 88/16* | (2009.01) |

(52) U.S. Cl.
CPC ....... *H04M 1/72522* (2013.01); *H04W 4/003* (2013.01); *H04W 4/20* (2013.01); *H04W 36/0033* (2013.01); *H04W 36/0044* (2013.01); *H04W 36/18* (2013.01); *H04W 88/08* (2013.01); *H04W 88/16* (2013.01)

(58) Field of Classification Search
CPC .. H04W 36/0044; H04W 36/12; H04L 67/10; H04L 12/4633; H04M 1/72522
See application file for complete search history.

(56) References Cited

U.S. PATENT DOCUMENTS

| | | |
|---|---|---|
| 2003/0204599 A1 | 10/2003 | Trossen et al. |
| 2003/0212764 A1 | 11/2003 | Trossen et al. |
| 2006/0056351 A1 | 3/2006 | Wall |
| 2008/0043672 A1* | 2/2008 | Sebire ............... H04W 36/0055 370/331 |
| 2008/0225798 A1 | 9/2008 | Trossen |
| 2012/0129517 A1* | 5/2012 | Fox .................... H04L 41/5025 455/425 |

FOREIGN PATENT DOCUMENTS

| | | |
|---|---|---|
| EP | 2007098 A1 | 12/2008 |
| EP | 2403186 A1 | 1/2012 |
| GB | 2481716 A | 1/2012 |
| WO | 0106732 A1 | 1/2001 |
| WO | 2011038359 A2 | 3/2011 |

OTHER PUBLICATIONS

3rd Generation Partnership Project, "3rd Generation Partnership Project; Technical Specification Group Services and System Aspects; IP Multimedia Subsystem (IMS); Stage 2 (Release 11)", Technical Specification, 3GPP TS 23.228 V11.5.0, Jun. 1, 2012, pp. 1-288, 3GPP, France.

* cited by examiner

CO-LOCATION OF APPLICATION SERVICE PLATFORM WITH ACCESS NODE AND LOCAL GATEWAY

TECHNICAL FIELD

The present invention relates to methods for providing an application service in a telecommunications network and to corresponding devices.

BACKGROUND

In telecommunications networks, e.g., as specified by 3GPP (3$^{rd}$ Generation Partnership Project), it is known to provide application services to users of the telecommunications network. Examples of such application services are Internet Protocol (IP) based multimedia services. One possibility is to provide the application services by application servers in a core network (CN) of the telecommunications network. A further possibility is to add an application service (AS) platform at nodes of an access network of the telecommunications network. Examples of such access nodes are nodes of a RAN of a cellular mobile telecommunications system, such as a Radio Network Controller (RNC) of the UMTS (Universal Mobile Telecommunications System) Terrestrial Radio Access Network (UTRAN) or a base station of the evolved UTRAN (E-UTRAN) according to 3GPP LTE (Long Term Evolution), referred to as E-UTRAN Node B (eNB). Such AS platform may be implemented as an open Information Technology (IT) platform which can host applications provided by the operator of the telecommunications network and also applications provided by other parties.

In a typical scenario, a user equipment (UE) connected to the telecommunications network via a given access node would access an application running on the AS platform at this access node. The AS platform could then expose useful information available at the access node to the application, e.g., information on radio channel characteristics, UE identifiers, or the like.

Since the telecommunications network is typically equipped with a plurality of access nodes, also a plurality of AS platforms may be provided. Such plurality of AS platforms may be used for providing application services in a cloud infrastructure.

Cloud computing may be defined as the provision of computing and/or storage capacity as a service to a heterogeneous community of end-recipients. It may allow access to fully featured applications, to software development and deployment environments, and to computing infrastructure assets such as network-accessible data storage and processing. A cloud computing system may be deployed privately or hosted on the premises of a cloud customer.

When using the above concept providing application services in a cloud infrastructure, network resources of the telecommunications network may be integrated with the cloud infrastructure. The possibility of using so-called carrier grade networks enables the deployment of highly demanding applications in the cloud, e.g. by providing guaranteed response times, security measures and the like. Such cloud services are also denoted as "carrier cloud", see for example http://en.wikipedia.org/wiki/Carrier_Cloud. They may be distributed over several nodes of the provider network, and may also access further services or resources outside the provider network.

When providing an AS platform together with access nodes at access sites, this may however impact requirements on interfaces between the access sites and central nodes of the telecommunications network, in particular when considering that the number of such access Sites may be in the order of tens of thousands. Accordingly, a scalability problem may arise.

Accordingly, there is a need for techniques which allow for providing efficient communication between access sites equipped with an AS platform and central nodes of a telecommunications network.

SUMMARY

According to an embodiment of the invention, a method of providing an application service in a telecommunications network is provided. The telecommunications network is accessible to a UE via an access node. According to the method, an AS platform is provided at the access node. The AS platform is for supporting one or more application services which are accessible to the UE via the access node. Further, a local gateway node is provided. The local gateway node is co-located with the access node and carries user plane data of the UE between the access node and the AS platform. Control plane communication between the local gateway node and at least one central node of the telecommunications network is performed via a central gateway node connected between the local gateway node and the central node of the telecommunications network.

According to a further embodiment of the invention, a network node is provided. The network node comprises an access node for providing access of a UE to a telecommunications network. Further, the network node comprises an AS platform for supporting one or more application services which are accessible to the UE via the access node. Moreover, the network node comprises a local gateway node which is co-located with the access node and carries user plane data of the UE between the access node and the AS platform. The local gateway node is configured to perform control plane communication with at least one central node of the telecommunications network via a central gateway node connected between the local gateway node and the central node of the telecommunications network.

According to a further embodiment of the invention, a network node is provided. The network node comprises a central gateway node for connection between a local gateway node and a central node of a telecommunications network. The local gateway node is co-located with an access node for providing access of a UE to the telecommunications network. The central gateway node is configured to forward control plane communication between the local gateway node and the at least one central node.

According to a further embodiment of the invention, a network system is provided. The network system comprises an access node for providing access of a UE to a telecommunications network. Further, the network system comprises an AS platform for supporting one or more application services which are accessible to the UE via the access node. Moreover, the network node comprises a local gateway node which is co-located with the access node and carries user plane data of the UE between the access node and the AS platform. In addition, the network system comprises a central gateway node connected between the local gateway node and a central node of the telecommunications network. The central gateway node is configured to forward control plane communication between the local gateway node and the at least one central node.

According to a further embodiment of the invention, a computer program product is provided. The computer program product comprises program code to be executed by a processor of a network node, thereby configuring the network node to operate in accordance with the above method.

DETAILED DESCRIPTION OF EMBODIMENTS

In the following, the invention will be explained in more detail by referring to exemplary embodiments and to the accompanying drawings. The illustrated embodiments relate to concepts of providing an application service in a telecommunications network. The concepts may be used for providing a distributed cloud in a RAN, for example the RAN of a cellular mobile telecommunications network. For this purpose corresponding systems, methods, and network nodes may be implemented. In the illustrated embodiments, the telecommunications network implements cellular radio access technology, such as Global System for Mobile Communication (GSM), Wideband Code Division Multiple Access (WCDMA), UMTS, or LTE. Further, the telecommunications network supports packet based data communication, such as by the General Packet Radio Service of GSM and UMTS or by the Evolved Packet System (EPS) of LTE. However, it is to be understood that the illustrated concepts could also be implemented in other types of telecommunications network.

Figure 1:
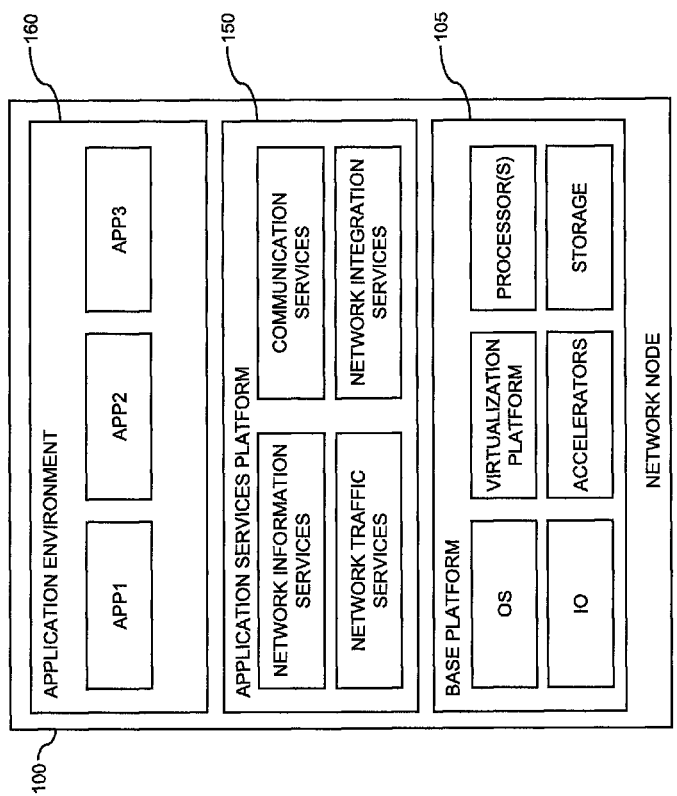
FIG. 1 schematically illustrates a network node according to an embodiment of the invention.

FIG. 1 schematically illustrates a network node 100 according to an embodiment of the invention. As further explained below, the network node 100 may be a node of a RAN of the telecommunications network. In particular, the node may implement an access node in the form of a base station, e.g., an eNB, or a controller of a base station, e.g., an RNC. In the illustrated example, the network node 100 is provided with a base platform 105. The base platform 105 comprises hardware and software structures as required for implementing typical functionalities of the access node. As illustrated in FIG. 1, such hardware structures may include one or more processors, e.g., in the form of a Central Processing Unit and/or a set of special purpose processors. Further, such hardware structures may include a storage, e.g., in the form of a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The storage may store program code to be executed by the processor(s), e.g., for implementing the software structures, and/or other data. Still further, such hardware structures may include one or more accelerators, e.g., for supporting certain computation tasks such as coding or decoding, and Input/Output (IO) device(s), e.g., interfaces, receivers, or transmitters. The software structures may include an operating system (OS). Further, the base platform 105 may include a virtualization platform which may be implemented by software structures, but may also be supported by hardware structures.

In addition, the network node 100 includes an AS platform 150 for providing one or more application services to one or more UEs connected to the telecommunications network. The AS platform 150 may be implemented by software structures utilizing hardware and/or software structures of the base platform 105. The AS platform 150 in turn may support an application environment 160 for hosting one or more applications (in the illustrated example shown as APP1, APP2, APP3). Each application may be designed for providing a corresponding application service to the UEs. The applications may be provided by the operator of the telecommunications network and/or by some other party. The AS platform 150 may also connect to other network nodes or external nodes, e.g., for network management and control.

As can be seen, the AS platform 150 is integrated in the network node 100 to provide application services at the network node 100. In this way, network and/or processing load for providing the application services may be efficiently distributed in the telecommunications network.

The AS platform 150 may be regarded as a middleware between the base platform 105 and the applications running in the application environment. The AS platform 150 may provide functionalities such as basic communication methods and control mechanisms, e.g., allowing the application services to communicate with each other, with other external applications, and/or with other functionalities implemented by the hardware and/or software structures of the network node 100. In the example of FIG. 1, the functionalities provided by the AS platform 150 are referred to as network information services (NIS), network traffic services, network integration services, and communication services. The network traffic services functionality may for example provide routing and priority of UE traffic streams between the access node and one or more applications running on the AS platform 150, or between the access node and Internet. The network integration services may provide interfaces to existing CN functionality relating to, e.g., policy control, charging and lawful/legal interception. Network traffic services and network integration services may be provided for example by functionalities which are similar to those as typically implemented by a user plane gateway. The communication services may provide functionalities used for communications between applications running on the AS platform 150 and other of the functionalities of the AS platform 150.

The functionality referred to as NIS has the purpose of exposing information about the network node 100 and its connected UEs to the applications running in the application environment 160. The information about the network node 100 may for example include a number of connected UEs, e.g., as identified by a Radio Resource Control (RRC) functionality of the network node 100, an average of transmit powers controlled by the network node 100, an average throughput of a cell controlled by the network node 100, an average delay of packets buffered by the network node 100, an average High Speed (HS) code utilization, e.g., average utilization of High Speed Packet Access (HSPA) channelization codes, or the like. Such information about a UE may include an identifier of the UE, e.g., an International Mobile Subscriber Identity (IMSI) associated with the UE, a Mobile Station International Subscriber Directory Number (MSISDN) associated with the UE, a Temporary Mobile Subscriber Identity (TMSI) associated with the UE, a Global Unique Temporary Identity (GUTI) of the UE, an International Mobile Equipment Identity (IMEI) of the UE, or a Radio Network Temporary Identity (RNTI) assigned to the UE. Further, such information about a UE may include radio channel information such as a RRC State indication for the UE, a serving cell or neighboring cell Reference Signal Received Power (RSRP) or Reference Signal Received Quality (RSRQ) or signal to noise and/or interference measure like Ec/No (Chip energy to Noise spectral density) ratio measured by the UE, a Channel Quality Indicator (CQI) determined by the UE, a transmit power of the UE, or the like. The information may be divided into RAN information as typically available at an access node, e.g., an eNB or an RNC, and CN information as typically available at CN nodes of the telecommunications network, e.g., at a gateway node. The RAN information may include the GUTI, TMSI, RNTI, RRC state indication, serving cell RSRP/RSRQ, neighboring cell RSRP/RSRQ, Ec/No ratio, transmit powers, average transmit powers, CQI, cell throughput, or the like. The CN information may include the IMSI, IMEI, MSISDN, UE IP address(es), information on activated bearers and related Traffic Flow Template (TFT) and/or Quality of Service (QoS) parameters or the like.

The NIS functionality may aggregate such information and make the information available to the applications running in the application environment, e.g., through an Application Programming Interface to facilitate usage of the information by applications from various parties. Such API could also be provided by a specific API aggregation application running in the application environment.

One example of the above applications that may be realized on the basis of the AS platform 150 and utilizes the information provided by the network information services functionality is a Transport Control Protocol (TCP) proxy that changes the TCP congestion window as a function of the radio network information it gets via the NIS functionality (or via an API aggregation application).

By providing multiple network nodes with a structure as illustrated in FIG. 1, a distributed cloud computing infrastructure in the RAN of the telecommunications network may be implemented, thereby combining traditional cloud computing with access to additional RAN-specific services, e.g., through specific APIs, with applications running close to or within the RAN cloud. When third party applications are being run inside the distributed cloud, they can get access to high speed, low latency RAN APIs that may use information in the RAN.

The distributed RAN cloud may be viewed as an advanced hosting platform or open IT platform that offers more possibilities than conventional cloud solutions. The distributed RAN cloud may offer local processing, local storage, and high speed access to APIs providing services from the RAN.

Figure 2:
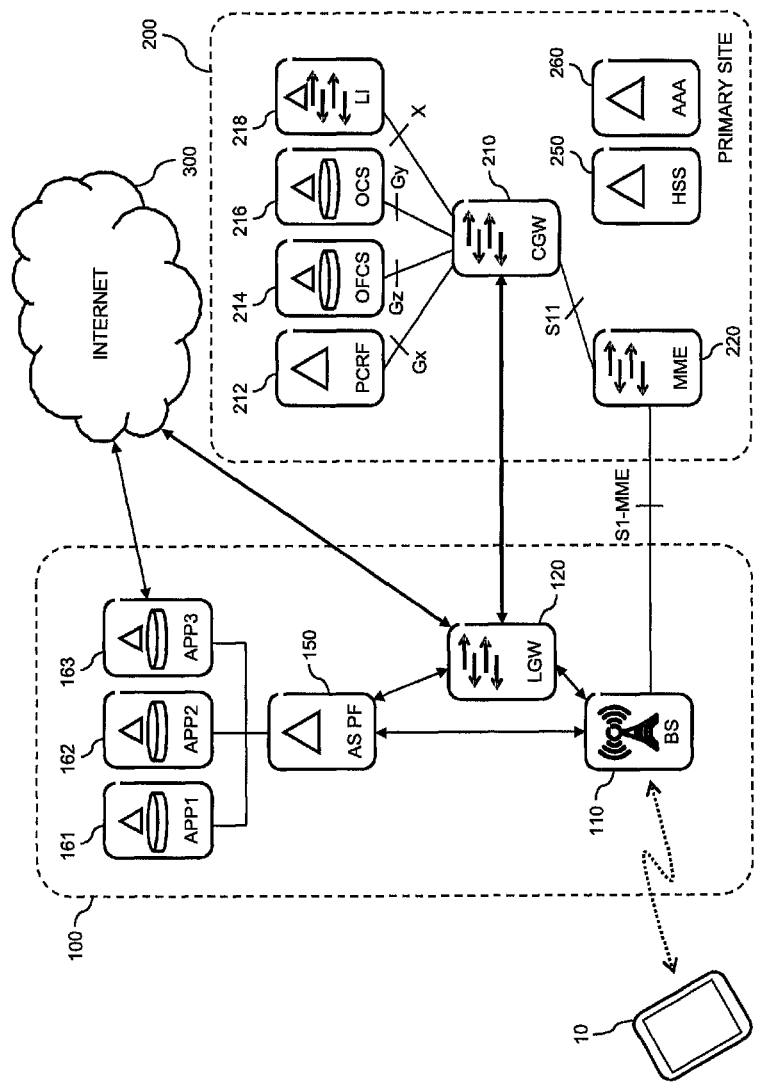
FIG. 2 schematically illustrates an implementation in which an AS platform is provided at a base station of a mobile telecommunications network.

An exemplary implementation of the AS platform at a 3GPP LTE base station (BS), i.e., an eNB, is further illustrated in FIG. 2. In this implementation, a network node 100 includes the BS 110 and the AS platform (AS PF) 150. By way of example, applications 161, 162, 163 are illustrated as being implemented on the basis of the AS platform 150. Further, the network node 100 also includes a local gateway node (LGW) 120 for carrying user plane data between the UE 10 and the Internet 300. As regards the handling of user plane data, the local gateway node 120 may implement functionalities of a Serving Gateway (SGW) and/or a Packet Data Network Gateway (PGW). The network node 100 may be implemented on the basis of a common base platform 105 as illustrated in FIG. 1 and/or on the basis of multiple co-located devices. For example, a device implementing the BS 110 and the AS platform 150 could be co-located with a further device implementing the local gateway node 120, or a device implementing the BS 110 could be co-located with a further device implementing the local gateway node 120 and the AS platform 150. In the following, co-location of certain nodes is considered to cover both implementation of the nodes in the same device, e.g., on the basis of a common base platform as illustrated in FIG. 1, and implementation of the nodes in different but co-located devices. In the example of FIG. 2, the AS platform 150 is placed, in terms of network hierarchy, above the interface between the PGW and the Internet 300, referred to as SGi interface. This means that the SGW and PGW are placed below the AS platform 150. The SGW and PGW may also be referred to as user plane gateways.

The network node 100 of FIG. 2 is located at an access site, i.e., at a location of the BS 110. Further, FIG. 2 illustrates exemplary CN nodes which are located at a primary site 200 of the telecommunications network, namely a Policy and Charging Rules Function (PCRF) 212, an Offline Charging System (OFCS) node 214, an Online Charging System (OCS) node 216, a Legal Interception (LI) node 218, a Mobility Management Entity (MME) 220, a Home Subscriber Server (HSS) 250, and an Authentication, Authorization, and Accounting (AAA) server 260. The primary site 200 may correspond to a central switching site. At such central switching site for example peering points for connecting to the Internet 300 may be located. However, it is to be understood that it is also possible to locate one or more of the illustrated CN nodes differently, e.g., at intermediate switching sites.

Further, the primary site 200 includes a central gateway node (CGW) 210. The central gateway node 210 communicates with the local gateway node 120. Details of this communication will be further explained below. Further, the central gateway node 210 is equipped with interfaces to other nodes of the CN. In the illustrated example, the central gateway node 210 is equipped with an interface to the PCRF 212, referred to as Gx interface, an interface to the OFCS node 214, referred to as Gz interface, and interface to the OCS node 216, referred to as Gy interface, an interface to the LI node 218, referred to as X interface, and an interface to the MME 220, referred to as S11 interface. In this way, the central gateway node 210 may forward control plane communication between the local gateway node 120 and the central gateway node 210. Concerning user plane data, the central gateway node 210 may implement the same functionalities as the local gateway node 120, e.g., functionalities of an SGW and/or PGW. In addition, FIG. 2 illustrates a control plane interface between the MME 220 and the BS 110, referred to as S1-MME.

In the implementation of FIG. 2, co-locating the local gateway node 120 with the BS 110 and the AS platform 150 allows for efficiently using the local gateway node 120 as a decision point for selectively directing user plane data of the UE 10 to the AS platform 150 or to the Internet 300 or to services provided at the primary site 200. Further, mechanisms of the local gateway node 120 can be utilized for applying charging, policy and/or QoS control, and/or lawful interception also to the user plane data between the UE 10 and the AS service platform 150.

Figure 3:
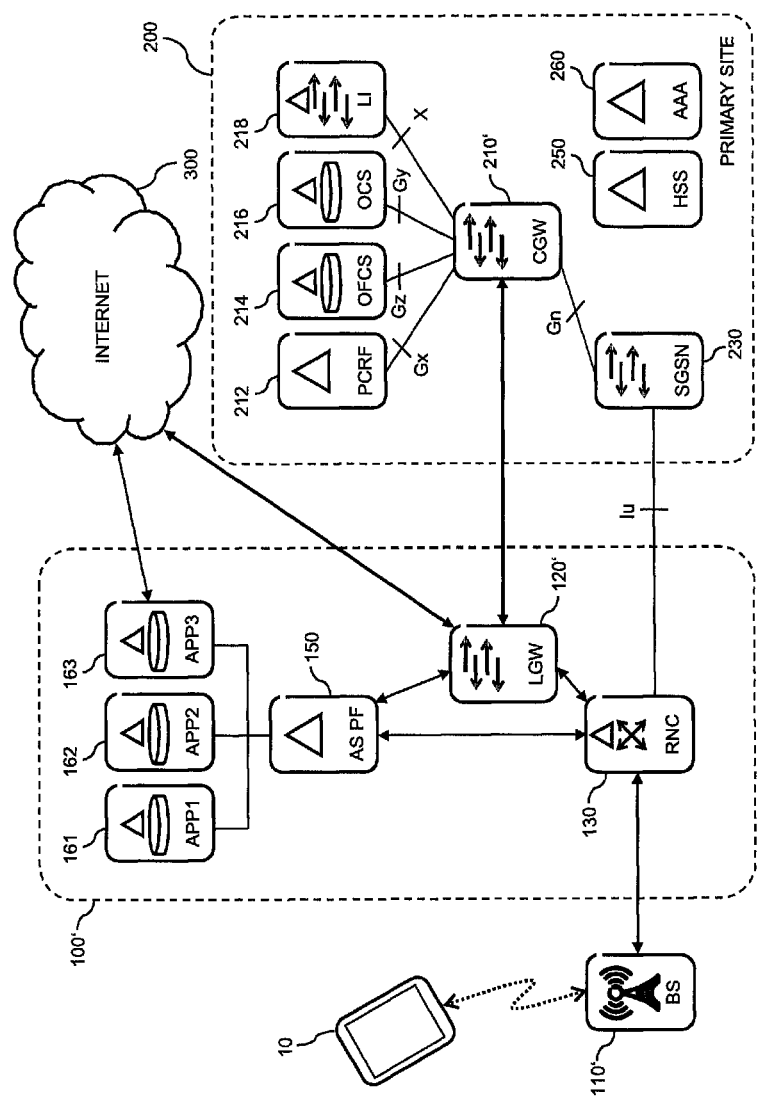
FIG. 3 schematically illustrates an implementation in which an AS platform is provided at a controller of a base station of a mobile telecommunications network.

FIG. 3 illustrates an exemplary implementation of the AS platform at a radio network controller (RNC), e.g., at an RNC in a UTRAN or a Base Station Controller (BSC) in a GSM Radio Access Network (GERAN) supporting GPRS. In this implementation, a network node 100' includes the RNC 130 and the AS platform 150. By way of example, applications 161, 162, 163 are illustrated as being implemented on the basis of the AS platform 150. Further, the network node 100' also includes a local gateway node (LGW) 120' for carrying user plane data between the UE 10 and the Internet 300. As regards the handling of user plane data, the local gateway node 120' may implement functionalities of a Serving Gateway Support Node (SGSN) and/or Gateway GPRS Support Node (GGSN). In some implementations, the local gateway node 120' may also implement functionalities of an SGW and/or PGW. The network node 100' may be implemented on the basis of a common base platform 105 as illustrated in FIG. 1 and/or on the basis of multiple co-located devices. For example, a device implementing the RNC 130 and the AS platform 150 could be co-located with a further device implementing the gateway node 120', or a device implementing the RNC 130 could be co-located with a further device implementing the gateway node 120' and the AS platform 150. In some implementations, also the BS 110' could be co-located with the network node 100', e.g., when assuming an architecture with combined BS 110' and RNC 130, such as in GPRS with High Speed Packet Access (HSPA).

The network node 100' of FIG. 3 may be located at an access site, e.g., if the RNC 130 and the BS 110' are combined or co-located, or may be located at a local switching site arranged between the site of the BS 110' and a central primary site 200 of the telecommunications network. Further, FIG. 3 illustrates exemplary CN nodes which are located at the primary site 200 of the telecommunications network, namely a PCRF 212, an OFCS node 214, an OCS node 216, an LI node 218, an SGSN 230, a HSS 250, and an AAA server 260. The primary site 200 may correspond to a central switching site. At such central switching site for example peering points for connecting to the Internet 300 may be located. However, it is to be understood that it is also possible to locate one or more of the illustrated CN nodes differently, e.g., at intermediate switching sites.

Further, the primary site 200 includes a central gateway node (CGW) 210'. The central gateway node 210' communicates with the local gateway node 120'. Details of this communication will be further explained below. Further, the central gateway node 210' is equipped with interfaces to nodes of the CN. In the illustrated example, the central gateway node 210' is equipped with an interface to the PCRF 212, referred to as Gx interface, an interface to the OFCS node 214, referred to as Gz interface, and interface to the OCS node 216, referred to as Gy interface, an interface to the LI node 218, referred to as X interface, referred to as S11 interface, and an interface to the SGSN 230, referred to as Gn interface. In this way, the central gateway node 210' may forward control plane communication between the local gateway node 120' and the central gateway node 210'. Concerning user plane data, the central gateway node 210' may implement the same functionalities as the local gateway node 120', e.g., functionalities of an SGSN and/or GGSN. In addition, FIG. 3 illustrates a control plane interface between the SGSN 230 and the RNC 130, referred to as Iu.

In the implementation of FIG. 3, co-locating the local gateway node 120' with the RNC 130 and the AS platform 150 allows for efficiently using the local gateway node 120' as a decision point for selectively directing data traffic of the UE 10 to the AS platform 150 or to the Internet 300 or to services provided at the primary site 200. Further, mechanisms of the local gateway node 120' can be utilized for applying charging, policy and/or QoS control, and/or lawful interception also to the data traffic between the UE 10 and the AS service platform 150.

In the implementations of FIGS. 2 and 3, the PCRF 212 may be used for providing policy based network resource control, e.g., with respect to QoS. Such policy control functionalities may for example be implemented in accordance with 3GPP TS 23.203. The Policy and Charging Control (PCC) architecture of 3GPP TS 23.203 may be used for flow-based charging, including, for example, online credit control, as well as policy control, which includes support for service authorization and QoS management.

The PCRF 212 typically contains policy control decision and flow-based charging control functionalities. The PCRF 212 is provided with an interface, referred to as Rx, over which external or internal application servers can provide service information, including resource requirements and IP flow related parameters. Further, the PCRF 212 is provided with the Gx interface towards user plane gateways such as the GGSN or PGW, in particular with respect to a functionality of such user plane gateways referred to as Policy Enforcement Function (PCEF). The PCRF 212 may use the Gx interface for provisioning and removal of PCC rules in the PCEF. The PCEF may use the Gx interface for indicating user data plane events to the PCRF 212. The Gx interface can be used for charging control and/or policy control by applying attribute value pairs (AVPs) relevant to a given application. The Gx reference point can also be used for application traffic detection and control. Further details on signalling on the Rx and Gx interfaces can be found in 3GPP TS 29.213.

Charging functionalities such as provided by the OFCS node 214 or the OCS node 216 are typically based on receiving information from various charging points in the network. For this purpose, such charging points are interfaced with the OFCS node 214 or the OCS node 216. Such charging functionalities may for example be implemented in accordance with 3GPP TS 32.240.

LI functionalities such as provided by the LI node 218 may be used for intercepting network data pursuant to lawful authority for the purpose of analysis or evidence. Such intercepted network data may include control signalling and/or network management information. In some cases, such intercepted network data may also include communication content, i.e., user plane data.

For implementing LI functionalities in a network architecture as illustrated in FIGS. 2 and 3, various interception points may be provided in the network, e.g., at user plane gateways. Such interception points are in turn interfaced with the LI node 218. The interface between such interception point and the LI node 218 may be used for providing the intercepted network data to the LI node 218. RAN nodes as the BS 110 of FIG. 2 or the BS 110' or RNC 130 of FIG. 3 are typically not used as interception points.

In the implementations of FIGS. 2 and 3, the UE 10 may use an application service provided by one of the applications 161, 162, 163. The user plane data would then be routed to the AS platform 150 and to the corresponding application 161, 162, 163. This application 161, 162, 163 may turn access the Internet 300 as needed. Through the AS platform 150, in particular through a NIS functionality as mentioned above, the application may also obtain information on the UE 10 as available from UE context data at the BS 110 or at the RNC 130, e.g., GUTI, RNTI, RRC State indication, serving cell RSRP/RSRQ, neighboring cell RSRP/RSRQ or a signal to noise and/or interference measure like Ec/No ratio, CQI, UE transmit power, or the like.

In addition, the application may also obtain information on the access node itself, i.e., on the BS 110, 110' or the RNC 130. Such information may include, a number of connected UEs, an average transmit power, an average cell throughput, an average delay of buffered packets, and/or an average HS code utilization as mentioned above.

In the implementations of FIGS. 2 and 3, the AS platform 150 may be used for providing an execution environment for applications that benefit from a location closer to the end-user. In some scenarios, the AS platform 150 may implement an open IT platform which may be used for running applications provided by various parties.

As mentioned above, the local gateway node 120, 120' may be used as a decision point for selectively directing data traffic of the UE 10 to the AS platform 150 or to the Internet 300, e.g., for implementing a breakout functionality to a RAN cloud implemented by the AS platform 150.

As can be seen from FIGS. 2 and 3, various central nodes of the CN may need to communicate with user plane gateways such as the SGW, PGW, SGSN, or GGSN. Distributing such user plane gateways towards the access sites may therefore increase the number of user plane gateways a particular central node needs to communicate with. In typical telecommunications systems a OCS node, OFCS node, LI node, or PCRF is provided with up to ten direct interfaces to user plane gateways. However, the number of access sites is significantly larger and may be in the order of tens of thousands.

In order to avoid scalability problems with respect to direct interfaces between such central nodes and user plane gateways, concepts as described herein are based on a two-level hierarchy of user plane gateways. A first level of user plane gateways is formed of central gateway nodes, such as the central gateway node 210/210' in the primary site 200. Such central gateway nodes may also be distributed to some degree towards the access sites. A second level of user plane gateways is formed of local gateway nodes which can be distributed all the way to the access sites, e.g., to local switching sites or up to BS sites. Such local gateway nodes may implement the above cloud breakout function.

As for example illustrated in FIGS. 2 and 3, the central gateway nodes may be provided with direct interfaces to central nodes of the CN, e.g., to OFCS, OCS, PCRF, LI, or the like. In the local gateway nodes, such direct interfaces may be omitted, and communication with such central nodes may be accomplished via a central network node connected to the local gateway node. At the local gateway node, such indirect communication may be implemented by the above-mentioned network integration services functionality. Such communication may be based on a user plane traffic tunnel between the local gateway node and the central gateway node, e.g., on the basis of the user plane GPRS Tunnel Protocol (GTP-U). Using the user plane traffic tunnel, the central gateway node may send information received from a central node such as OFCS, OCS, PCRF, LI, or the like to the local gateway node currently serving the UE. In this way, the local gateway node may be provided with information needed to handle functionalities related to the OFCS, OCS, PCRF, and/or LI nodes. Similarly, the local gateway node may use the user plane traffic tunnel for sending any information destined to such central node to the central gateway node, which may then forward the information to the destination central node. Alternatively, such information may be conveyed in control plane messages between the access node at the local gateway node and the central gateway node. Here, it should be noted that such user plane traffic tunnel and control plane messages may be UE specific, which allows for efficiently distributing the control plane communication to the specific local gateway node serving the UE. In such architecture, the local gateway node may remain invisible to the CN, e.g., to the MME 220 or SGSN 230, because the central gateway node may be responsible for all communication with the CN, i.e., act as the selected user plane gateway for the UE, while the central gateway node may act as a signalling proxy.

Accordingly, the concepts involve that a local gateway node, e.g., the local gateway node 120 or 120', is co-located with an access node provided with an AS platform, e.g., the BS 110 or RNC 130 with the AS platform 150, and carries user plane data of a UE between the access node and the AS platform, and that control plane communication between the local gateway node and at least one central node of the telecommunications network is performed via a central gateway node, e.g., the central gateway node 210 or 210', connected between the local gateway node and the central node of the telecommunications network. The at least one central node may comprise a policy control node, e.g., the PCRF 212, a node of a charging system, e.g., the OFCS node 214 or the OCS node 216, or a lawful intercept node, e.g., the LI node 218. Accordingly, the control plane communication may include information for providing policy control functionalities at the local gateway node, charging related information, or intercepted user plane and/or control plane data.

In some implementations, a user plane traffic tunnel between the local gateway node and the central gateway node may be established and the control plane communication between the local gateway node and the central node may be performed via the user plane traffic tunnel. The user plane traffic tunnel may be established for carrying user plane data of the UE. In some implementations, the communication between the local gateway node and the central node may also be performed via control plane signalling, typically UE specific, between the access node and the central gateway node.

The local gateway node may perform a decision whether to route data traffic of the UE to the AS platform. The decision may be performed on the basis of control information received through the control plane communication with the central node.

In some implementations, the communication between the central gateway node and the local gateway node may also be used for controlling a decision whether certain user plane data should be directed to the AS platform implemented at the access node or not. User plane data not directed to the AS platform may be routed to the central gateway node, which means that the central gateway node can be used as a single access point to central or Internet based services.

In some implementations local gateway information, such as context data of the UE as available at the local gateway node, may be provided from the access node to a further access node at handover from the access node to the further access node, e.g., before, during or after the handover. The access node may obtain the local gateway information from the local gateway at the access node and provide the local gateway information to the further access node, e.g., using handover preparation signalling or other handover related signalling. Similarly, local gateway information such as the context data may be provided from the further access node to the access node at handover from the further access node to the access node. The access node may obtain the local gateway information from the further access node, e.g., using handover preparation signalling or other handover related signalling, and provide the local gateway information to the local gateway at the access node. The local gateway information may include information obtained through the communication with the central node. The local gateway information may also include information from a mobility controller of the central gateway, e.g., the MME 220 or SGSN 230.

Figure 4:
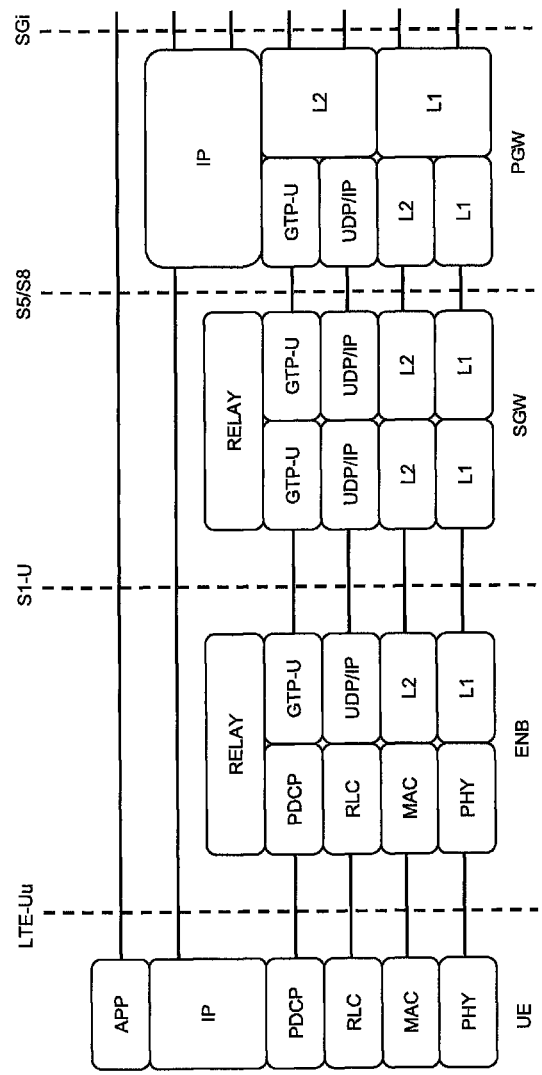
FIG. 4 illustrates a protocol structure for transmission of user plane data in between a UE and a telecommunications network.

As mentioned above, the communication between the central gateway node and the local gateway node serving the UE may be accomplished via a user plane traffic tunnel. By way of example, FIG. 4 shows the user plane protocol architecture for the EPS which involves the UE, the eNB, the SGW, and the PGW. In FIG. 4, a GTP-based S5/S8 interface between the SGW and the PGW is assumed. As can be seen, corresponding GTP-U functionalities are provided in the protocol stacks of the PGW, SGW and eNB. Further details of the protocol architecture can for example be found in 3GPP TS 23.401.

Figure 5:
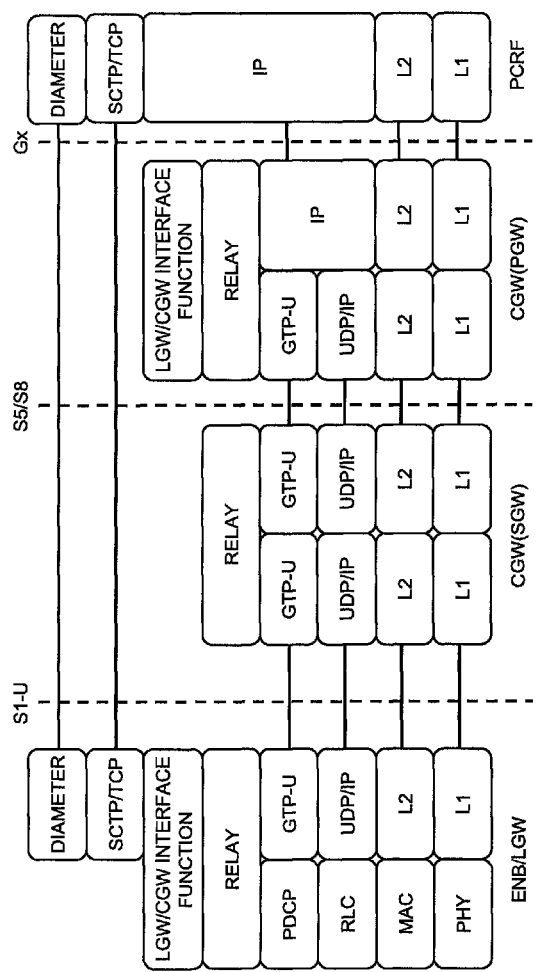
FIG. 5 illustrates a protocol structure for communication between a local gateway node and a central node in accordance with an embodiment of the invention.

For forwarding the control plane signalling between a central node of the CN and the local gateway, the above user plane protocol architecture may be supplemented by a LGW/CGW interface function in the eNB, at which the LGW is located, and the PGW which is implemented at the CGW. In FIG. 5 this is illustrated for the exemplary case of control plane signaling with the PCRF. As illustrated, the CGW may also implement the SGW. In the illustrated protocol architecture, the LGW/SGW function is placed above the GTP-U protocol layer. Accordingly, the GTP-U tunnel may be used as transport mechanism between the LGW/CGW interface function at the LGW and the LGW/CGW interface function at the CGW. The SCTP/TCP and Diameter protocol layers of the Gx interface between the PCRF and the LGW at the eNB are placed above the LGW/CGW interface functions.

In the protocol architecture of FIG. 5, the control plane signalling from the PCRF for a specific UE may first be conveyed over the direct Gx interface from the PCRF to the PGW at the CGW. The CGW may terminate this control plane signalling so that the CGW appears as the serving PGW for the UE. Using the LGW/CGW interface function, the CGW then forwards the control plane signalling to the LGW at the eNB by transporting the SCTP/TCP and Diameter protocol data over the GTP-U tunnel for the UE. Alternatively, it would also be possible to send only the Diameter protocol data over the GTP-U tunnel, without transmitting the underlying SCTP/TCP protocol information, e.g., by moving Attribute Value Pairs (AVPs) of the Diameter protocol to GTP-U tunnel. Using its LGW/CGW interface function, the LGW receives the Diameter protocol data, which can then be applied for controlling PGW functionalities at the LGW.

In the opposite direction, the LGW at the eNB may generate control plane signalling for the UE which is destined to the PCRF and use the LGW/CGW interface function at the LGW to move the Diameter protocol data and optionally also the underlying SCTP/TCP protocol information to the GTP-U tunnel for the UE. The CGW receives the Diameter protocol data via its LGW/CGW interface function and forwards the Diameter protocol data to the PCRF, using the direct Gx interface between the CGW and the PCRF.

Figure 6:
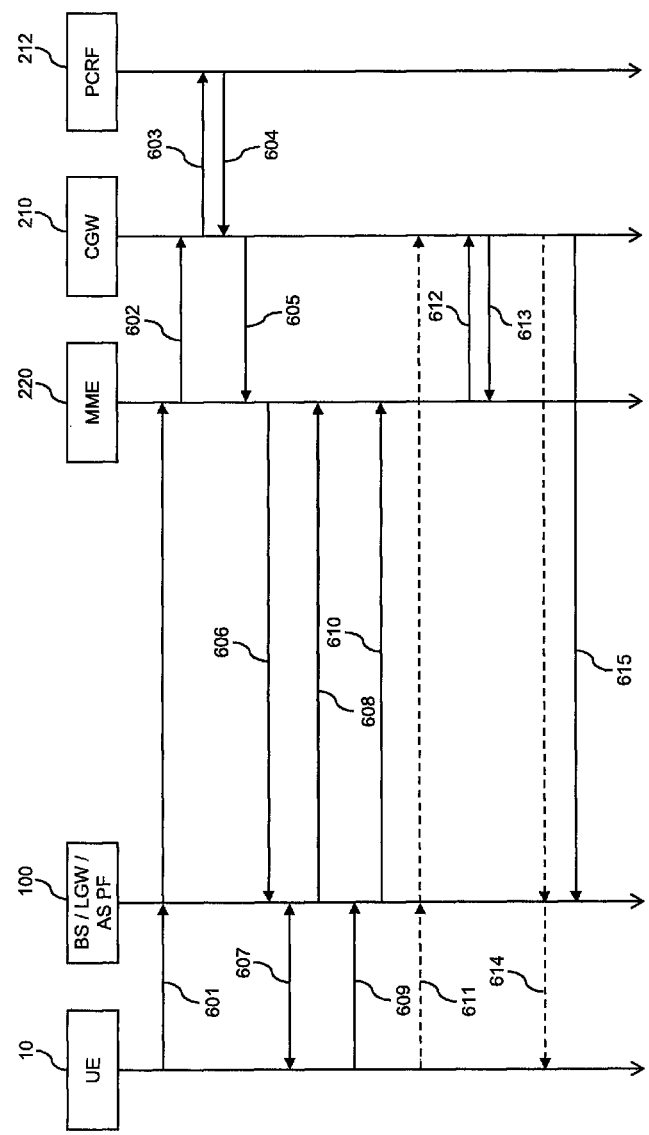
FIG. 6 shows a signalling diagram for illustrating policy control procedures in accordance with an embodiment of the invention.

FIG. 6 shows a signalling diagram for illustrating exemplary procedures which may be used for implementing the above concepts in connection with establishment or modification of a connection between the UE 10 and the telecommunications network. The procedures involve the UE 10, the network node 100 with co-located eNB, AS platform and LGW, the MME 220, the CGW 210, and the PCRF 212. In the procedures of FIG. 6, it is assumed that the LGW and the CGW implement functionalities of an SGW and/or PGW.

By sending message 601 via the eNB at the network node 100 to the MME 220, the UE 10 may for example trigger a Non Access Stratum (NAS) Attach procedure or some other procedure for establishing or modifying a connection between the UE 10 and the telecommunications network, e.g., any procedure in which a bearer for the UE 10 is created or modified. It is noted that it is not necessary that such procedures are initiated by the UE 10, but could also be initiated by some network node. The message 601 may be a UE Attach Request.

The MME 220 may then send message 602 to the CGW 210 to request creation of a session. Message 602 may be a Create Session Request of the control plane GPRS Tunnel Protocol (GTP-C).

The CGW 210 may then send message 603 to the PCRF 212 to request QoS rules and other information. Message 603 may be a Credit Control Request (CCR) message of the Diameter protocol implemented on the direct Gx interface between the CGW 210 and the PCRF 212. The PCRF 212 replies by sending message 604 to the CGW 210. Message 604 may be a Credit Control Answer (CCA) message of the Gx interface protocol. Upon receiving message 604, the CGW 210 may allocate an uplink user plane IP address and Tunnel Endpoint Identifier (TEID) of the CGW 210 for a GTP tunnel between the CGW 210 and the eNB at the network node 100. Further, the CGW 210 may temporarily store contents of the message 604.

The CGW 210 may then send message 605 to the MME 220. Message 605 may be a GTP-C Create Session Response. Message 605 may include the uplink user plane IP address and TEID of the CGW 210.

The MME 220 may then send message 606 to the eNB at the network node 100, to initiate creation or modification of a radio context of the UE 10 at the eNB. Message 606 may be an Initial Context Setup Request of the 51 interface Application Protocol (S1-AP) and it may include an Attach Accept NAS message. Message 606 may include the user plane IP address and TEID of the CGW 210. Upon receiving message 606, the eNB may allocate a downlink user plane IP address and TEID of the eNB for the GTP tunnel between the CGW 210 and the eNB.

As indicated by messages 607, the eNB may also configure the radio connection to the UE 10, e.g., by using RRC Reconfiguration procedures.

The eNB at the network node 100 may then send message 608 to the MME 220. Message 608 may be an S1-AP Initial Context Setup Response. Message 608 may include the downlink user plane IP address and TEID of the eNB.

The UE 10 may then send message 609 to the eNB at the network node 100. Message 609 may be a Direct Transfer and/or Attach Complete message of the RRC protocol between the UE 10 and the eNB. The eNB at the network node 100 may then send message 610 to the MME 220. Message 610 may be an S1-AP Attach Complete message. Message 609 and 610 may be used for indicating completion of radio connection configuration and attachment.

At this point, the GTP-U tunnel is activated in the uplink and the UE 10 may perform a first transmission of uplink user plane data towards the CGW 210, as indicated by message 611.

The MME 220 may further react to message 608 by sending message 612 to the CGW 210. Message 612 may be a Modify Bearer Request and may indicate the downlink user plane IP address and TEID of the eNB. The CGW 210 may respond to message 612 by sending message 613. Message 613 may be a Modify Bearer Response.

At this point, when the CGW 210 has received information on the downlink user plane IP address and TEID of the eNB, the GTP-U tunnel for the UE 10 is activated also in the downlink, and the CGW 210 may perform a first transmission of downlink user plane data, as indicated by message 614.

The CGW 210 may then use the GTP-U tunnel for the UE 10 to forward the contents of message 604 to the LGW at the network node 100, as indicated by message 615. The LGW at the network node 100 may use the contents of the message 604 to perform policy control operations.

The LGW at the network node 100 may also use the GTP-U tunnel for the UE 10 to send information to the PCRF 212. In this case the GTP-U tunnel is used for conveying such information to the CGW 210, which then forwards the information to the PCRF 210 using the direct Gx interface between the CGW 210 and the PCRF 212.

The above signalling principle can also be used for other information. For example, the LGW at the network node 100 may also need information that the CGW 210 receives from other central nodes. For example, the MME 210 could indicate such information to the CGW 210, e.g., an Access Point Name (APN) used for the connection between the UE 10 and the Internet. This may for example be achieved by using the GTP-U tunnel for the UE 10 for forwarding the message 602 or contents of the message 602 to the LGW at the network node 100. The LGW may for example use such information for setting up a local termination point for user plane data that shall be terminated locally at the network node 100. The user plane data to terminate locally can either be configured in the LGW or handled through IP routing to server(s) that are available locally at the network node 100.

Figure 7:
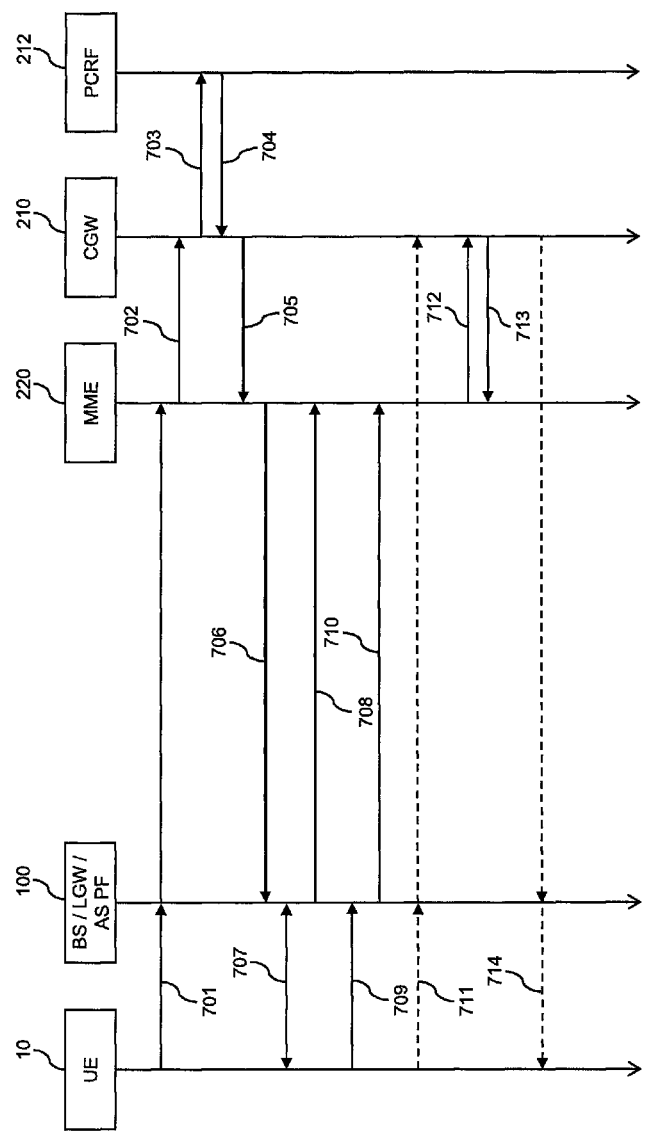
FIG. 7 shows a signalling diagram for illustrating further policy control procedures in accordance with an embodiment of the invention.

FIG. 7 shows a signalling diagram for illustrating further exemplary procedures which may be used for implementing the above concepts in connection with establishment or modification of a connection between the UE 10 and the telecommunications network. The procedures involve the UE 10, the network node 100 with co-located eNB, AS platform and LGW, the MME 220, the CGW 210, and the PCRF 212. In the procedures of FIG. 7, it is assumed that the LGW and the CGW implement functionalities of an SGW and PGW. As compared to the procedures of FIG. 6, which involve forwarding of control signalling via the GTP-U tunnel for the UE 10, the procedures of FIG. 7 involve using UE specific control plane signalling with the eNB to convey control signalling from the PCRF 212 to the LGW at the network node 100.

By sending message 701 via the eNB at the network node 100 to the MME 220, the UE 10 may for example trigger an NAS Attach procedure or some other procedure for establishing or modifying a connection between the UE 10 and the telecommunications network, e.g., any procedure in which a bearer for the UE 10 is created or modified. It is noted that it is not necessary that such procedures are initiated by the UE 10, but could also be initiated by some network node. The message 701 may be a UE Attach Request.

The MME 220 may then send message 702 to the CGW 210 to request creation of a session. Message 702 may be a GTP-C Create Session Request.

The CGW 210 may then send message 703 to the PCRF 212 to request QoS rules and other information. Message 703 may be a CCR message of the Diameter protocol implemented on the direct Gx interface between the CGW 210 and the PCRF 212. The PCRF 212 replies by sending message 704 to the CGW 210. Message 704 may be a CCA message of the Gx interface protocol. Upon receiving message 704, the CGW 210 may allocate an uplink user plane IP address and TEID of the CGW 210 for a GTP tunnel between the CGW 210 and the eNB at the network node 100.

The CGW 210 may then send message 705 to the MME 220. Message 705 may be a GTP-C Create Session Response. Message 705 may include the uplink user plane IP address and TEID of the CGW 210. Further, message 705 may include message 704 or contents of message 704, for example the message 704 or contents of the message 704 could be included in message 705 by supplementing message 705 with a corresponding information element.

The MME 220 may then send message 706 to the eNB at the network node 100, to initiate creation or modification of a radio context of the UE 10 at the eNB. Message 706 may be an S1-AP Initial Context Setup Request and it may include an Attach Accept NAS message. Message 706 may include the user plane IP address and TEID of the CGW 210. Further, message 706 may include the message 704 or contents of message 704 as received with message 705. That is to say, the MME 220 copies the message 704 or contents thereof between GTP-C and S1-AP messages.

Upon receiving message 706, the eNB may allocate a downlink user plane IP address and TEID of the eNB for the GTP tunnel between the CGW 210 and the eNB.

As indicated by messages 707, the eNB may also configure the radio connection to the UE 10, e.g., by using RRC Reconfiguration procedures.

The eNB at the network node 100 may then send message 708 to the MME 220. Message 708 may be an S1-AP Initial Context Setup Response. Message 708 may include the downlink user plane IP address and TEID of the eNB.

The UE 10 may then send message 709 to the eNB at the network node 100. Message 709 may be a Direct Transfer message of the RRC protocol between the UE 10 and the eNB, and it may include an Attach Complete NAS message. The eNB at the network node 100 may then send message 710 to the MME 220. Message 710 may be an S1-AP Uplink NAS Transport message and it may include an Attach Complete NAS message. Messages 709 and 710 may be used for indicating completion of radio connection configuration and attachment.

At this point, the GTP-U tunnel is activated in the uplink and the UE 10 may perform a first transmission of uplink user plane data towards the CGW 210, as indicated by message 711.

The MME 220 may further react to message 708 by sending message 712 to the CGW 210. Message 712 may be a Modify Bearer Request and may indicate the downlink user plane IP address and TEID of the eNB. The CGW 210 may respond to message 712 by sending message 713. Message 713 may be a Modify Bearer Response.

At this point, when the CGW 210 has received information on the downlink user plane IP address and TEID of the eNB, the GTP-U tunnel for the UE 10 is activated also in the downlink, and the CGW 210 may perform a first transmission of downlink user plane data, as indicated by message 714.

The LGW at the network node 100 may use contents of the message 704 as received with control signalling for the UE 10 via messages 705 and 706 to perform policy control operations. In the opposite direction, the LGW at the network node 100 may also use the control signalling for the UE 10 as transmitted toward the MME 220 for conveying such information to the CGW 210, which then forwards the information to the PCRF 210 using the direct Gx interface between the CGW 210 and the PCRF 212. Here, it should be understood that the information which is transmitted between the LGW and the CGW 210 may be conveyed by including the information into one or more existing protocol messages on the S11 or S1-MME interfaces, e.g., S1-AP or GTP-C messages, or that dedicated protocol messages may be defined for this purpose.

Similar procedures as explained in connection with FIGS. 6 and 7 may also be used for implementing communication between the local gateway node 120/120' and other central nodes, e.g., for OCS, OFCS, or LI.

For example, for implementing OCS related functionalities in the local gateway node 120/120', the local gateway node 120/120' may need to send a CCR message to the OCS node 216 to request quota or to report service usage. A CCR message may be used when establishing a user session subject to charging, during the user session, or when terminating the user session. The OCS node 216 may respond with a CCA message, e.g., to grant or deny quota.

In some implementations, both the local gateway node 120/120' and the central gateway node 210/210' may independently request quota from OCS node 216. Communication between the local gateway node 120120' and the OCS node 216 may then be implemented transparently via the central gateway node 210/210'. For this purpose a UE specific user plane traffic tunnel, e.g., as explained in connection with FIG. 6, or UE specific control plane signaling to the access node at the local gateway node, e.g., as explained in connection with FIG. 7, may be used.

In some implementations, the central gateway node 210/210' may function as a proxy node for the local gateway node 120/120'. The central gateway node 210/210' may request quota from the OCS node 216 on behalf of the local gateway node 120/120' and communicate at least part of the quota to the local gateway node 120/120'. When the local gateway node 120/120' reports usage to the central gateway node 210/210', the central gateway node 210210' adds this usage to the usage monitored at the central gateway node 210/210'. The central gateway node 210/210' may then request more quota from the OCS node 216, or if it still had a quota left, it could allocate parts of this quota to the local gateway node 120/210'. Also in this case, communication between the local gateway node 120/120' and the central gateway node 210/210' could be based on a UE specific user plane traffic tunnel, e.g., as explained in connection with FIG. 6, or UE specific control plane signaling to the access node at the local gateway node, e.g., as explained in connection with FIG. 7. Implementations using a user plane traffic tunnel will be further explained in connection with FIGS. 8 to 11.

Figure 8:
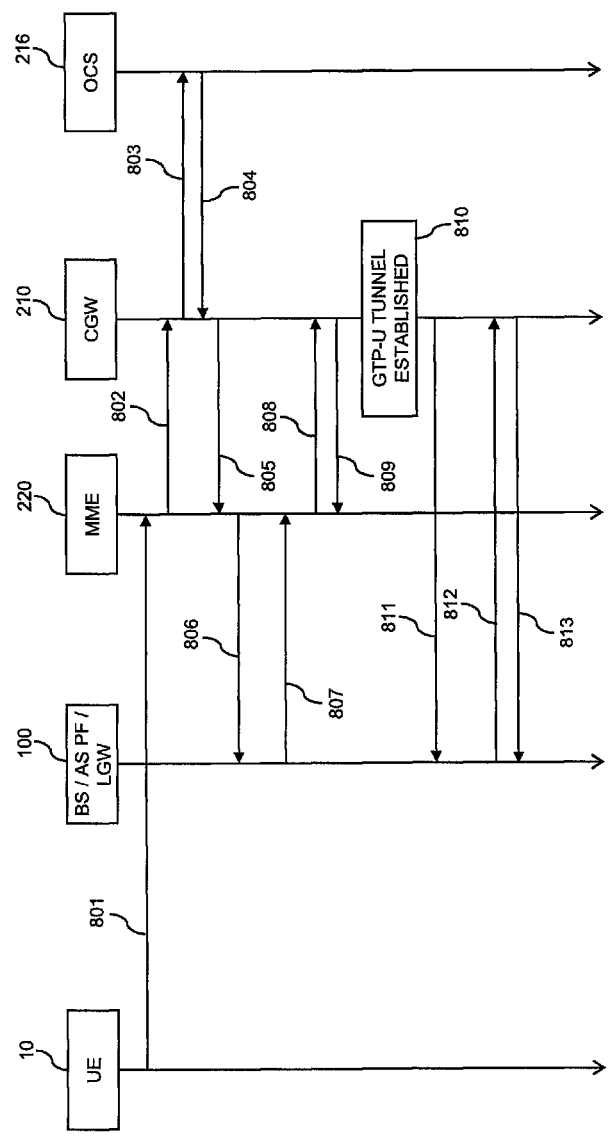
FIG. 8 shows a signalling diagram for illustrating charging procedures in accordance with an embodiment of the invention.
Figure 9:
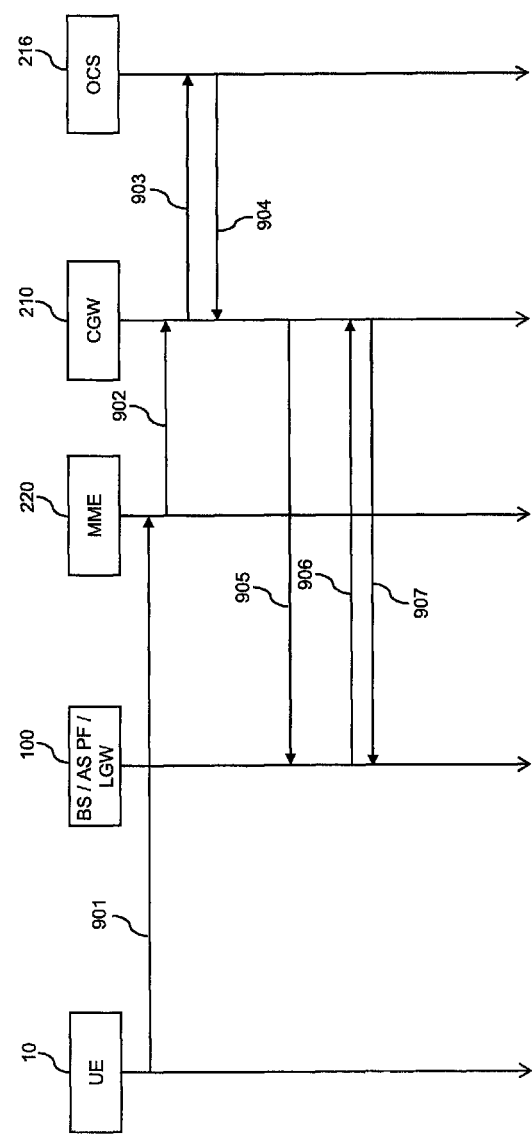
FIG. 9 shows a signalling diagram for illustrating further charging procedures in accordance with an embodiment of the invention.
Figure 10:
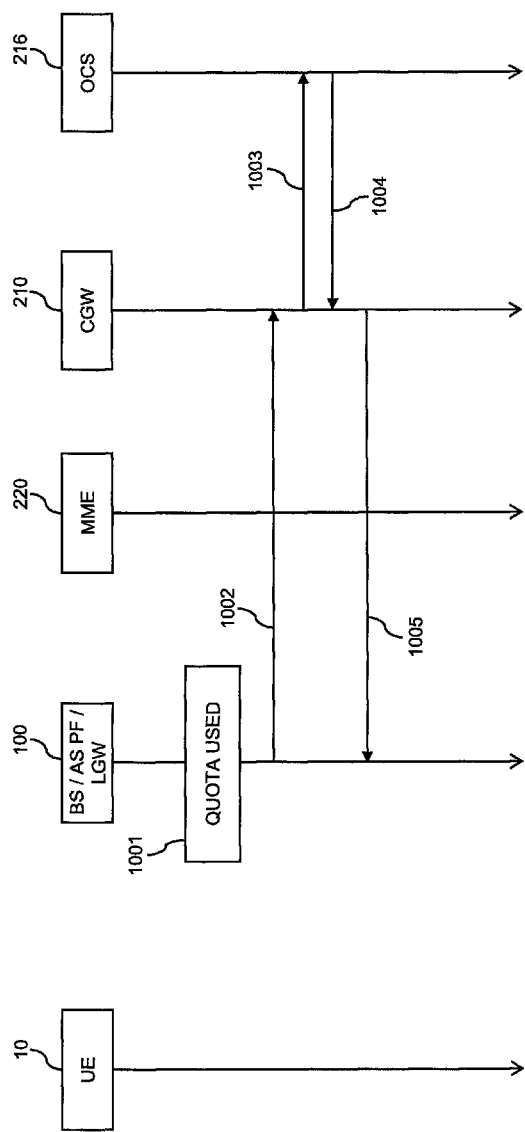
FIG. 10 shows a signalling diagram for illustrating further charging procedures in accordance with an embodiment of the invention.
Figure 11:
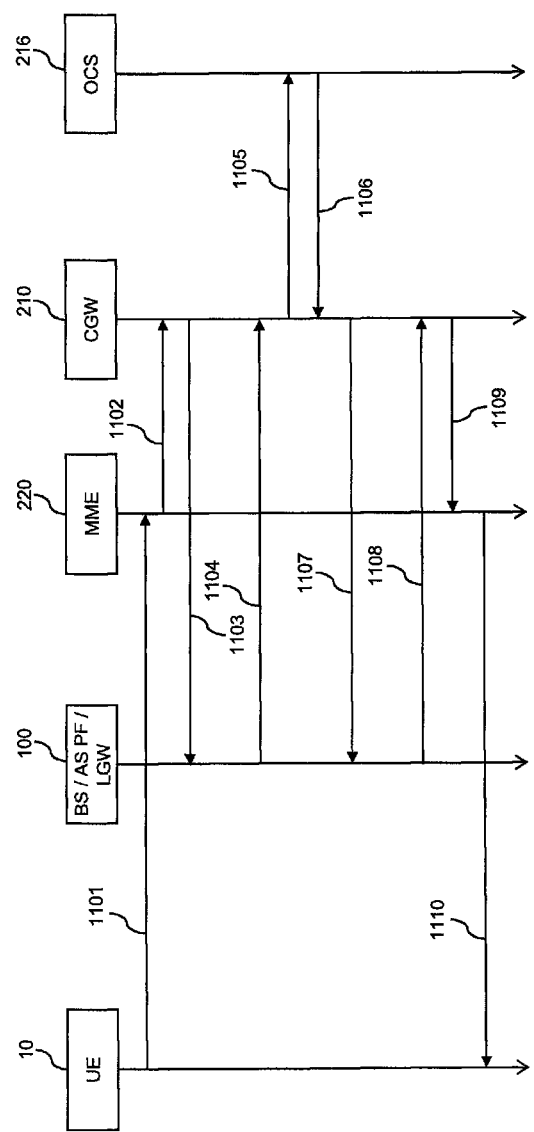
FIG. 11 shows a signalling diagram for illustrating further charging procedures in accordance with an embodiment of the invention.

FIGS. 8 to 11 illustrate exemplary procedures in relation to control signalling between the local gateway node and a central node for implementing charging functionalities. In the illustrated examples, this central node is assumed to be the OCS node 216. However, it is to be understood that similar procedures could also be used in connection with the OFCS node 214. The procedures of FIGS. 8 to 11 involve the UE 10, the network node 100 with co-located eNB, AS platform and LGW, the MME 220, the CGW 210, and the OCS node 214. The procedures are based on the LGW receiving quota from the OCS node 216. The LGW may also need to request more quota when the current quota for the UE 10 is about to be used up. FIG. 8 illustrates procedures for establishing a user session subject to charging. FIG. 9 illustrates procedures for requesting a new service subject to charging. FIG. 10 illustrates procedures for reporting used quota. FIG. 11 illustrates procedures for terminating a user session subject to charging.

In the procedures of FIG. 8, the UE 10 may initially send message 801 via the eNB at the network node 100 to the MME 220. Message 801 may be a NAS message requesting a new PDN (Packet Data Network) connection or attachment of the UE. The MME 220 may then send message 802 to the CGW 210 to request creation of a user session. Message 802 may be a GTP-C Create Session Request. The CGW 210 may temporarily store the message 802 or contents of the message 802.

The CGW 210 may then send message 803 to the OCS node 216 to establish a charging control session for the user session. Message 803 may be an initial CCR message of the Diameter protocol implemented on the direct Gy interface between the CGW 210 and the OCS node 216. Message 803 may for example include information as defined in 3GPP TS 32.299 and include a subscription identifier, e.g., the MSISDN associated with the subscription of the UE 10, an APN for the user session, QoS information for the user session, e.g., in terms of a QoS Class Indicator (QCI), or the like. The OCS node 216 replies by sending message 804 via to the CGW 210. Message 804 may be an initial CCA message of the Gy interface protocol. Message 803 may include information as defined in 3GPP TS 32.299.

The CGW 210 may then send message 805 to the MME 220. Message 805 may be a GTP-C Create Session Response. Message 805 may include the uplink user plane IP address and TEID of the CGW 210.

The MME 220 may then send message 806 to the eNB at the network node 100, to initiate creation or modification of a radio context of the UE 10 at the eNB. Message 806 may be an S1-AP Initial Context Setup Request. Message 806 may include the user plane IP address and TEID of the CGW 210. Upon receiving message 806, the eNB may allocate a downlink user plane IP address and TEID of the eNB for the GTP tunnel between the CGW 210 and the eNB.

The eNB at the network node 100 may then send message 807 to the MME 220. Message 807 may be an S1-AP Initial Context Setup Response. Message 807 may include the downlink user plane IP address and TEID of the eNB.

The MME 220 may react to message 807 by sending message 808 to the CGW 210. Message 808 may be a Modify Bearer Request and may indicate the downlink user plane IP address and TEID of the eNB. The CGW 210 may respond to message 808 by sending message 809. Message 809 may be a Modify Bearer Response.

At this point, as indicated by step 810, a GTP-U tunnel for the UE 10 is established and may be used for transmission of user plane data between the UE 10 and the CGW 210. In particular, a downlink user plane IP address and TEID of the eNB at the network node 100 may then be known at the CGW 210, and an uplink user plane IP address and TEID of the CGW 210 may then be known at the network node 100. The CGW 210 may then use the GTP-U tunnel for sending the message 802 or contents of the message 802 to the LGW at the network node 100, as indicated by message 811.

Using information from the message 811, the LGW at the network node 100 may then perform charging related functionalities, e.g., send message 812 to the CGW 210. Message 812 may be an initial CCR message of the Gy Diameter protocol, however in this case transmitted via the GTP-U tunnel for the UE 10. Message 812 may include similar information as mentioned above for message 803. The CGW 210 may terminate this request, i.e., act in a similar fashion as an OCS node, and respond by sending message 813. Message 813 may be an initial CCA message of the Gy Diameter protocol which is transmitted via the GTP-U tunnel for the UE 10 and include similar information as message 804.

It should be noted that FIG. 8 only illustrates communication related to the OCS node 216, but also other control signalling, e.g., with respect to the PCRF 212 may be triggered by message 801 or 802.

In the procedures of FIG. 9, it is assumed that a GTP-U tunnel for the UE 10 is already established, e.g., through procedures as illustrated in FIG. 8. In the procedures of FIG. 9, the UE 10 may initially send message 901 via the eNB at the network node 100 to the MME 220. Message 901 may be a NAS message for requesting a new PDN connection, e.g., for carrying a new service. The MME 220 may then send message 902 to the CGW 210 to request modification of the user session or creation of a further user session. Message 902 may be a GTP-C Modify Session Request or a GTP-Create Session Request.

The CGW 210 may then send message 903 to the OCS node 216 to request quota. Message 903 may be an update CCR message of the Diameter protocol implemented on the direct Gy interface between the CGW 210 and the OCS node 216. Message 903 may for example include information as defined in 3GPP TS 32.299 and include a subscription identifier, e.g., the MSISDN associated with the subscription of the UE 10, information specifying the requested quota, or the like. The OCS node 216 replies by sending message 904 to the CGW 210. Message 904 may be an update CCA message of the Gy interface protocol. Message 904 may include information as defined in 3GPP TS 32.299, e.g., information specifying the granted quota.

The CGW 210 may then use the GTP-U tunnel for sending the message 905 to the LGW at the network node 100. Message 905 may be an update CCA message of the Gy interface protocol which is transmitted via the GTP-U tunnel. Message 905 may include information as defined in 3GPP TS 32.299, e.g., information specifying the granted quota. Using information from the message 905 the LGW at the network node 100 may then perform charging related functionalities, e.g., send message 906 to the CGW 210. Message 906 may be an update CCR message of the Gy Diameter protocol, however in this case transmitted via the GTP-U tunnel for the UE 10. Message 906 may include similar information as mentioned above for message 903. The CGW 210 may terminate this request, i.e., act in a similar fashion as an OCS node, and respond by sending message 907 to the LGW. Message 907 may be an update CCA message of the Gy Diameter protocol which is transmitted via the GTP-U tunnel for the UE 10 and include similar information as message 904.

In the procedures of FIG. 10, it is assumed that a GTP-U tunnel for the UE 10 is already established, e.g., through procedures as illustrated in FIG. 8. Further, quota for a service may have been requested, e.g., using procedures as illustrated in FIG. 9. In the procedures of FIG. 10, an event relating to used quota may initially occur at step 1001. This event may be detected by the LGW at the network node 100, e.g., by performing typical charging related monitoring procedures.

The LGW at the network node 100 may then proceed by sending message 1002 to the CGW 210 to request new quota. Message 1002 may be an update CCR message of the Gy Diameter protocol, however transmitted via the GTP-U tunnel for the UE 10. Message 1002 may include information as defined in 3GPP TS 32.299 and include a subscription identifier, e.g., the MSISDN associated with the subscription of the UE 10, information specifying the requested quota, or the like.

The central gateway node 210 may then send message 1003 to the OCS node 216 to request new quota. Message 1003 may be an update CCR message of the Diameter protocol implemented on the direct Gy interface between the CGW 210 and the OCS node 216. Message 1003 may for example include information as defined in 3GPP TS 32.299 and include a subscription identifier, e.g., the MSISDN associated with the subscription of the UE 10, information specifying the requested quota, or the like. The OCS node 216 may reply by sending message 1004 to the CGW 210. Message 1004 may be an update CCA message of the Gy interface protocol. Message 1004 may include information as defined in 3GPP TS 32.299, e.g., information specifying the granted quota. Here, it should be noted that in message 1003 the CGW 210 may also report other used quota, e.g., as monitored at the CGW 210 itself or at other local gateway nodes connected to the CGW 210. Further, the CGW 210 might also determine that sufficient quota is already granted by the OCS node 216 and thus omit requesting new quota.

The CGW 210 terminates this request for new quota in message 1002, i.e., acts in a similar fashion as an OCS node, and may respond to the request of message 1002 by sending message 1005. Message 1005 may be an update CCA message of the Gy Diameter protocol which is transmitted via the GTP-U tunnel for the UE 10 and include as defined in 3GPP TS 32.299, e.g., information specifying the quota granted to the LGW at the network node 100.

In the procedures of FIG. 11, it is assumed that a GTP-U tunnel for the UE 10 is already established, e.g., through procedures as illustrated in FIG. 8. Further, quota for a service may have been requested, e.g., using procedures as illustrated in FIG. 9. Also reporting of used quota may have occurred, e.g., using procedures as illustrated in FIG. 10. In the procedures of FIG. 11, the UE 10 may initially send message 1101 via the eNB at the network node 100 to the MME 220. Message 1101 may be a NAS message requesting removal of a PDN connections. The MME 220 may then send message 1102 to the CGW 210 to request deletion of the user session. Message 1102 may be a GTP-C Delete Session Request.

The CGW 210 may then use the GTP-U tunnel for sending the message 1102 or contents of the message 1102 to the LGW at the network node 100, as indicated by message 1103. The LGW at the network node 100 may then proceed with the deletion of the user session by sending message 1104 to the CGW 210. Message 1104 may be a termination CCR message of the Gy Diameter protocol, however transmitted via the GTP-U tunnel for the UE 10. Message 1104 may include information as specified in 3GPP TS 32.299 and include a subscription identifier, e.g., the MSISDN associated with the subscription of the UE 10, information specifying the used quota, or the like.

The CGW 210 may then send message 1105 to the OCS node 216, thereby requesting deletion of the user session by the OCS node 216. Message 1105 may be a termination CCR message of the Diameter protocol implemented on the Gy interface between the CGW 210 and the OCS node 216. Message 1105 may include information as specified in 3GPP TS 32.299 and include a subscription identifier, e.g., the MSISDN associated with the subscription of the UE 10, information specifying the used quota, or the like. The OCS node 216 may reply by sending message 1106 to the CGW 210. Message 1106 may be a termination CCA message of the Gy interface protocol. Message 1106 may include information as defined in 3GPP TS 32.299.

The CGW 210 may terminate the request of message 1104, i.e., act in a similar fashion as an OCS node, and respond to the request of message 1104 by sending message 1107 to the LGW. Message 1107 may be a termination CCA message of the Gy Diameter protocol which is transmitted via the GTP-U tunnel for the UE 10 and include information as specified in 3GPP TS 32.299.

The LGW at the network node 100 may then respond to the deletion request of message 1103 by sending message 1108 to the CGW 210. Message 1108 may be a be GTP-C Deletion Response transmitted over the GTP-U tunnel for the UE 10. The CGW 210 may then respond to message 1102 by sending message 1109 to the MME 220, and the MME 220 may respond to message 1101 by sending message 1110 via the eNB at the network node 100 to the UE 10, thereby confirming deletion of the user session.

It should be noted that in the procedures of FIGS. 8 to 11, the order of the illustrated messages may be modified. For example in the procedures of FIG. 11, message 1109 could be transmitted before messages 1107 and 1108.

As can be seen from the procedures of FIGS. 6 to 11, a user plane traffic tunnel for the UE 10 or UE specific control signalling to the eNB can be used for forwarding the control signalling between a central node and the LGW at the network node 100. Although these procedures were described in relation to the PCRF 212 and OCS node 216, it is to be understood that they could be applied in a corresponding manner also for other central nodes such as the OFCS node 214 or the LI node 218. Furthermore, the procedures may also be applied in connection with the network node 100' with co-located RNC 130, local gateway node 120,' and AS platform 150 for providing communication over the central gateway node 210'.

In the above examples, also mobility of the UE between different access nodes may occur. For example, a UE may move between two eNBs or RNCs with co-located AS platform and local gateway node. In such cases, the central gateway node would typically act as mobility anchor which stays in the communication path between the UE and the telecommunications network. However, the eNB or RNC as well as the local gateway node may change. According to some implementations, this may be addressed by transferring context data of the UE available at the local gateway 120/120' node from one access node to the other access node when the UE moves between these access nodes. For example, handover preparation signalling may be used for this purpose. The context data of the UE at the local gateway node 120/120' may for example include information received from the central gateway node 210/210' and originating from the MME 220 or SGSN 230, information received from the central gateway node 210/210'and related to PCRF 212, information received from the central gateway node 210/210' and related to the OFCS 214, information received from the central gateway node 210/210' and related to the OCS 216, and/or information received from the central gateway node 210/210' and related to the LI node 218. Further, context data of the UE at the local gateway node 120/120' may include information locally created and related to OFCS, OCS, or LI functionalities, for example how much traffic for a specific rating group has been passing through but has not yet been reported to the OFCS/OCS.

Figure 12:
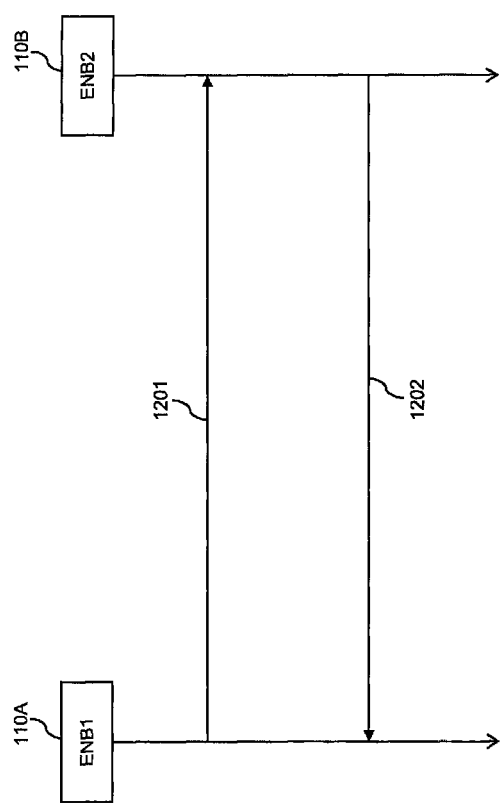
FIG. 12 shows a timing diagram for illustrating a handover preparation procedure which may be used in connection with mobility procedures in accordance with an embodiment of the invention.
Figure 13:
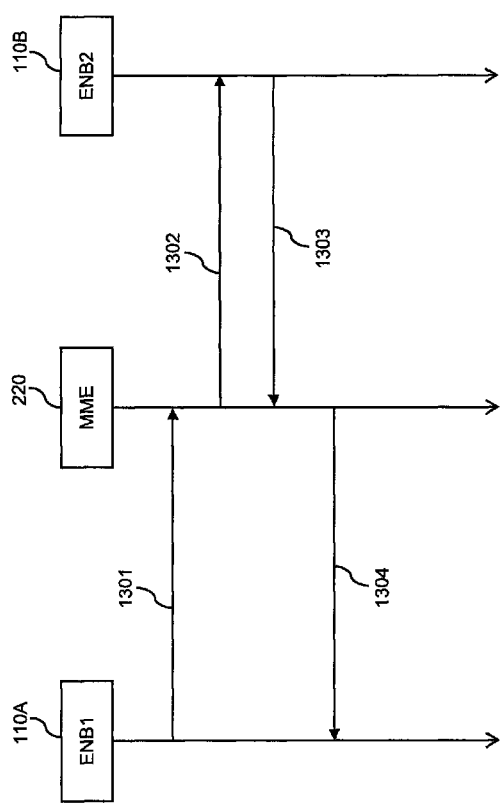
FIG. 13 shows a timing diagram for illustrating a further handover preparation procedure which may be used in connection with mobility procedures in accordance with an embodiment of the invention.

Exemplary handover preparation procedures in a 3GPP LTE scenario, which may be used for transferring the context data of the UE at the local gateway node 120, are further illustrated in FIGS. 12 and 13.

In FIG. 12 handover preparation over the LTE X2 interface between a source eNB 110A and target eNB 110B is illustrated. As illustrated, the handover preparation procedure involves transmitting a first message 1201, referred to as "Handover Request" from the source eNB 110A to the target eNB 110B. In some implementations, the message 1201 may be used for conveying the context data of the UE at the local gateway node 120 either by including the context data into message 1201 or by providing a reference allowing to retrieve the context data, e.g., in terms of network address or TEID of the source eNB. For conveying the information, the information element referred to as "Source eNB to Target eNB Transparent Container" specified in 3GPP TS 36.413 may be used.

Further, the handover preparation procedure of FIG. 12 involves transmitting a second message 1202, referred to as "Handover Request Acknowledge" from the target eNB 110B to the source eNB 110A.

In FIG. 13 handover preparation over the LTE 51 interfaces between a source eNB 110A and MME 220 and between the target eNB 110B and MME 220 is illustrated. As illustrated, the handover preparation procedure involves transmitting a first message 1301, referred to as "Handover Required" from the source eNB 110A to the MME 220, and transmitting a second message 1302, referred to as "Handover Request", from the MME 220 to the target eNB 110B. In some implementations, the message 1301 may be used for conveying the context data of the UE at the local gateway node 120 either by including the context data into message 1301 or by providing a reference allowing to retrieve the context data, e.g., in terms of network address or TEID of the source eNB. For conveying the information, the information element referred to as "Source eNB to Target eNB Transparent Container" specified in 3GPP TS 36.413 may be used.

Further, the handover preparation procedure involves transmitting a third message 1303, referred to as "Handover Request Acknowledge" from the target eNB 110B to the MME 220, and transmitting a fourth message 1304, referred to as "Handover Command" from MME 220 to the source eNB 110A.

It is to be understood that the procedures of FIGS. 12 and 13 are merely exemplary and that that corresponding solutions may also be applied in other mobility scenarios, e.g., mobility between access nodes of other radio access technologies, such as the RNC 130, or even between different radio access technologies.

It is to be understood that the examples and embodiments as explained above are merely illustrative and susceptible to various modifications. For example, the concepts could be used in connection with various types of telecommunications networks, e.g., implementing other types of radio access technologies. Also, it is to be understood that various types of access technology could be combined in the same telecommunications network, e.g., LTE access nodes and UMTS/GPRS access nodes as mentioned above.

Further, the above variants of conveying the communication between the local gateway node and the central gateway node over a user plane traffic tunnel and conveying the communication between the local gateway node and the central gateway node over control plane signalling between the central gateway node and the access node at the local gateway node could be combined, e.g., by initially using the control plane signalling for conveying the communication and then using the user plane traffic tunnel.

Moreover, it is to be understood that the above concepts may be implemented by using correspondingly designed software to be executed by one or more processors of an existing device, or by using dedicated device hardware. Also, the nodes as described herein may be implemented by a single device or by multiple devices, e.g., a device cloud or server farm.

The invention claimed is:

1. A method of providing an application service in a telecommunications network which is accessible to a user equipment via an access node, the method comprising:
   providing, at the access node, an application service platform for supporting one or more application services which are accessible to the user equipment via the access node;
   providing a local gateway node which is co-located with the access node and carries user plane data of the user equipment between the access node and the application service platform, wherein the local gateway node is placed, in terms of network hierarchy, below the application service platform so that the local gateway node is operable to determine whether to carry the user plane data of the user equipment to or from the application service platform; and
   wherein control plane communication between the local gateway node and at least one central node of the telecommunications network is performed via a central gateway node connected between the local gateway node and the at least one central node of the telecommunications network.

2. The method of claim 1, further comprising:
   establishing a user plane traffic tunnel between the local gateway node and the at least one central gateway node; and
   performing the control plane communication between the local gateway node and the at least one central node via the user plane traffic tunnel.

3. The method of claim 1, further comprising performing the communication between the local gateway node and the at least one central node via control plane signaling between the access node and the central gateway node.

4. The method of claim 1, further comprising deciding, at the local gateway node, whether to route data traffic of the user equipment to the application service platform.

5. The method of claim 4, wherein the deciding comprises deciding based on control information received through the control plane communication with the at least one central node.

6. The method of claim 1, wherein the at least one central node comprises one or more of:
   a policy control node;
   a node of a charging system; and
   a lawful intercept node of the telecommunications network.

7. The method of claim 1, further comprising during handover of the user equipment from the access node to a further access node, the access node obtaining local gateway information from the local gateway at the access node and providing the local gateway information to the further access node.

8. The method of claim 7, wherein the local gateway information comprises information obtained through the communication with the at least one central node.

9. The method of claim 7, wherein the local gateway information comprises information from a mobility controller of the central gateway.

10. The method of claim 1, further comprising at handover of the user equipment from a further access node to the access node, the access node obtaining local gateway information from the further access node and providing the local gateway information to the local gateway at the access node.

11. The method of claim 10, wherein the local gateway information comprises information obtained through the communication with the at least one central node.

12. The method of claim 10, wherein the local gateway information comprises information from a mobility controller of the central gateway.

13. The method of claim 1, wherein the control plane communication comprises information for providing policy control functionalities at the local gateway node, charging related information, or intercepted user plane and/or control plane data.

14. The method of claim 1, wherein the local gateway node is placed, in terms of network hierarchy, below the application service platform so as to carry data to and from the application service platform.

15. The method of claim 1, wherein the control plane communication includes information for providing policy control functionality at the local gateway node, charging related information, or intercepting user or control plane data between the local gateway node and the at least one central node.

16. A network node, comprising:
   one or more processing circuits and a memory, the memory comprising instructions executable by the one or more processing circuits, whereby the network node is configured to function as:
   an access node configured to provide access of a user equipment to a telecommunications network;
   an application service platform configured to support one or more application services which are accessible to the user equipment via the access node;
   a local gateway node which is co-located with the access node and is configured to carry user plane data of the user equipment between the access node and the application service platform; and
   wherein the local gateway node is configured to perform control plane communication with at least one central node of the telecommunications network via a central gateway node connected between the local gateway node and the central node of the telecommunications network, wherein the local gateway node is placed, in terms of network hierarchy, below the application service platform so that the local gateway node is operable to determine whether to carry the user plane data of the user equipment to or from the application service platform.

17. A network node, comprising:
one or more processing circuits and a memory, the memory comprising instructions executable by the one or more processing circuits, whereby the network node is configured to function as a central gateway node for connection between a local gateway node and a central node of a telecommunications network, the local gateway node being co-located with both an access node for providing access of a user equipment to the telecommunications network and an application service platform for supporting one or more application services which are accessible to the user equipment via the access node, wherein the local gateway node is placed, in terms of network hierarchy, below the application service platform so that the local gateway node is operable to determine whether to carry user plane data of the user equipment to or from the application service platform; and
wherein the central gateway node is configured to forward control plane communication between the local gateway node and the at least one central node.

18. A network system, comprising:
a plurality of processing circuits and a memory, the memory comprising instructions executable by the one or more processing circuits, whereby the network system is configured to function as:
  an access node for providing access of a user equipment to a telecommunications network;
  an application service platform for supporting one or more application services which are accessible to the user equipment via the access node;
  a local gateway node which is co-located with the access node and is configured to carry user plane data of the user equipment between the access node and the application service platform, wherein the local gateway node is placed, in terms of network hierarchy, below the application service platform so that the local gateway node is operable to determine whether to carry the user plane data of the user equipment to or from the application service platform;
  a central gateway node connected between the local gateway node and a central node of the telecommunications network; and
  wherein the central gateway node is configured to forward control plane communication between the local gateway node and the central node.

19. A computer program product stored in a non-transitory computer readable medium for providing an application service in a telecommunications network which is accessible to a user equipment via an access node, the computer program product comprising software instructions which, when run on one or more processing circuits, causes the one or more processing circuits to:
  provide, at the access node, an application service platform for supporting one or more application services which are accessible to the user equipment via the access node;
  provide a local gateway node which is co-located with the access node and carries user plane data of the user equipment between the access node and the application service platform, wherein the local gateway node is placed, in terms of network hierarchy, below the application service platform so that the local gateway node is operable to determine whether to carry the user plane data of the user equipment to or from the application service platform; and
wherein control plane communication between the local gateway node and at least one central node of the telecommunications network is performed via a central gateway node connected between the local gateway node and the at least one central node of the telecommunications network.

\* \* \* \* \*